United States Patent [19]

Wallace et al.

[11] Patent Number: 4,758,867
[45] Date of Patent: Jul. 19, 1988

[54] MICROFILM RECORDER SYSTEM

[76] Inventors: A. Lindsay Wallace, 9659 Jordan Way, South Jordan, Utah 84065; Thomas A. Hoopes, 1463 E. Stanley Dr., Sandy, Utah 84092

[21] Appl. No.: 857,292

[22] Filed: Apr. 30, 1986

[51] Int. Cl.$^4$ .................... G03B 27/32; G03B 27/52
[52] U.S. Cl. .................................................. 355/64
[58] Field of Search ........................................ 355/64

[56] References Cited

U.S. PATENT DOCUMENTS

| | | | |
|---|---|---|---|
| 3,784,303 | 1/1974 | Sullivan et al. | 355/64 |
| 3,998,544 | 12/1976 | Pass et al. | 355/64 |
| 4,153,361 | 5/1979 | Axelrod | 355/64 |
| 4,655,583 | 4/1987 | Kitai et al. | 355/64 |

Primary Examiner—Monroe H. Hayes
Attorney, Agent, or Firm—Thorpe, North & Western

[57] ABSTRACT

A microfilm recorder system includes a frame, a film supply canister mountable on the frame for holding a roll of microfilm, a film take-up canister insertable on and removable from the frame for receiving the film, and a film transport assembly for moving the film from the film supply canister to the film take-up canister. The film take-up canister includes a reel on which film is wound when the reel is rotated, and a driven mechanism which, when driven, causes the reel to rotate. A driving mechanism is mounted on the frame to automatically engage and drive the driven mechanism when the film take-up canister is inserted on the frame. The frame includes an exposure section located between the film supply canister and the film take-up canister through which film travels, a first pair of generally parallel, spaced-apart rails extending in a first direction from the exposure section, and a second pair of generally parallel, spaced-apart rails extending in a second direction, opposite the first direction, from the exposure section. Both the film supply canister and the film take-up canister include a pair of generally parallel tracks located on opposite sides of the canisters so that the tracks of the film supply canister may engage and slide along the first pair of rails when the canister is inserted therebetween, and so that the tracks on the film take-up canister can engage and slide along the second pair of rails when that canister is inserted therebetween.

32 Claims, 5 Drawing Sheets

MICROFILM RECORDER SYSTEM

BACKGROUND OF THE INVENTION

This invention relates to a reel-to-reel microfilm recorder system which may be operated automatically under control of a computer or other control device.

There are a variety of computer-controlled microfilm recorder systems, commonly called computer-output microfilm recorders (COM). Such systems are used for storing vast amounts of data, either alphanumeric, graphic, or both on film. The most common type system utilizes rolls of microfilm which, after the film is exposed and developed, are cut into sheets called microfiche.

A few microfilm recorder systems have been developed which, rather than using rolls of microfilm, copy data onto single, pre-cut sheets of microfilm. The individual sheets are held in cartridges which are loaded into the system prior to exposure of the sheets. After exposure, the cartridges are removed from the system for developing the microfilm sheets.

The currently available microfilm recorder systems, whether of the type which use rolls of microfilm or of the type which use single, pre-cut film sheets, are generally complicated and costly in design and constuction, cumbersome and somewhat time consuming to initialize and use, and relatively difficult to load, unload and service.

SUMMARY OF THE INVENTION

It is an object of the invention to provide a microfilm recorder system which is simple in design and construction and yet efficient and accurate in producing microfilm records.

It is another object of the invention to provide such a system which may be easily initialized, loaded and unloaded, and serviced.

It is a further object of the invention to provide a reel-to-reel microfilm recorder system which is inexpensive and simple to use.

The above and other objects and advantages of the invention are realized in a specific illustrative embodiment of a microfilm recorder system for recording optical images on reel-wound film. The system includes a frame, a film supply canister mountable on the frame for holding a roll of microfilm, a film take-up canister insertable on and removable from the frame for receiving the film from the film supply canister, and a film transporting mechanism for moving the film for exposure between the film supply canister and the film take-up canister. The film take-up canister includes a reel on which the film is wound when the reel is rotated, and a driven gear which, when driven, causes the reel to rotate. When the film take-up canister is inserted onto the frame, the driven gear automatically engages a driving gear which may be in the form of a toothed belt, gear wheel, etc.

In accordance with one aspect of the invention, the frame includes an exposure section located between the film supply canister and the film take-up canister over which film travels after it is withdrawn from the film supply canister and before it is delivered to the film take-up canister. The frame also includes a first pair of generally parallel, spaced-apart rails extending in one direction from the exposure section, and a second pair of generally parallel, spaced-apart rails extending in the opposite direction from the exposure section. The film supply canister and the film take-up canister each include a pair of generally parallel tracks located on opposite sides thereof for receiving a corresponding pair of rails when the canisters are inserted between those rails. The rails and tracks on the canisters serve to properly align the canisters for withdrawing film from the supply canister and supplying it to the take-up canister. The canisters are automatically locked in position when inserted a predetermined distance onto corresponding rails.

In accordance with another aspect of the invention, film guides are attached to the film supply canister and the film take-up canister. The guides define generally planar slots for aligning and guiding the film between the film supply canister and the film take-up canister.

The mechanical features described above may be operated under control of a stored program microprocessor which would both control movement of the microfilm, and monitor the film supply canister to terminate movement of the film when all of the film has been withdrawn from the film supply canister.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

The mechanical features of one illustrative embodiment of the microfilm recorder system of the present invention are shown in FIGS. 1 through 6. The microfilm recorder system includes a cabinet 4 in which are housed the system electronics, and on which are mounted mechanical apparatus to be discussed momentarily. A cover 6 is hingedly mounted on the cabinet 4 so that it can be raised to allow access to the mechanical apparatus or lowered to cover such apparatus. A cathode ray tube 8 is disposed in the cabinet 4 and is directed upwardly toward a base plate 10 which is mounted on the cabinet. A generally hollow cylindrical lens support base 12 is mounted on the base plate 10 about an opening in the base plate. An optical focusing lens 16 is carried by the support base 12 in line with the cathode ray tube 8 to focus the picture produced by the cathode ray tube onto a film plane 18 defined by the top of the lens. A control panel 20, including control buttons and switches 22 and a display window 24 is mounted on the top and at one side of the cover 6 to allow a user to initialize and control operation of the microfilm recorder system. The electronic circuitry for controlling operation of the system is housed behind the panel 20 and within the cabinet 4 on boards 25 and 26. All features described thus far are conventional in a microfilm recorder system.

Figure 2:
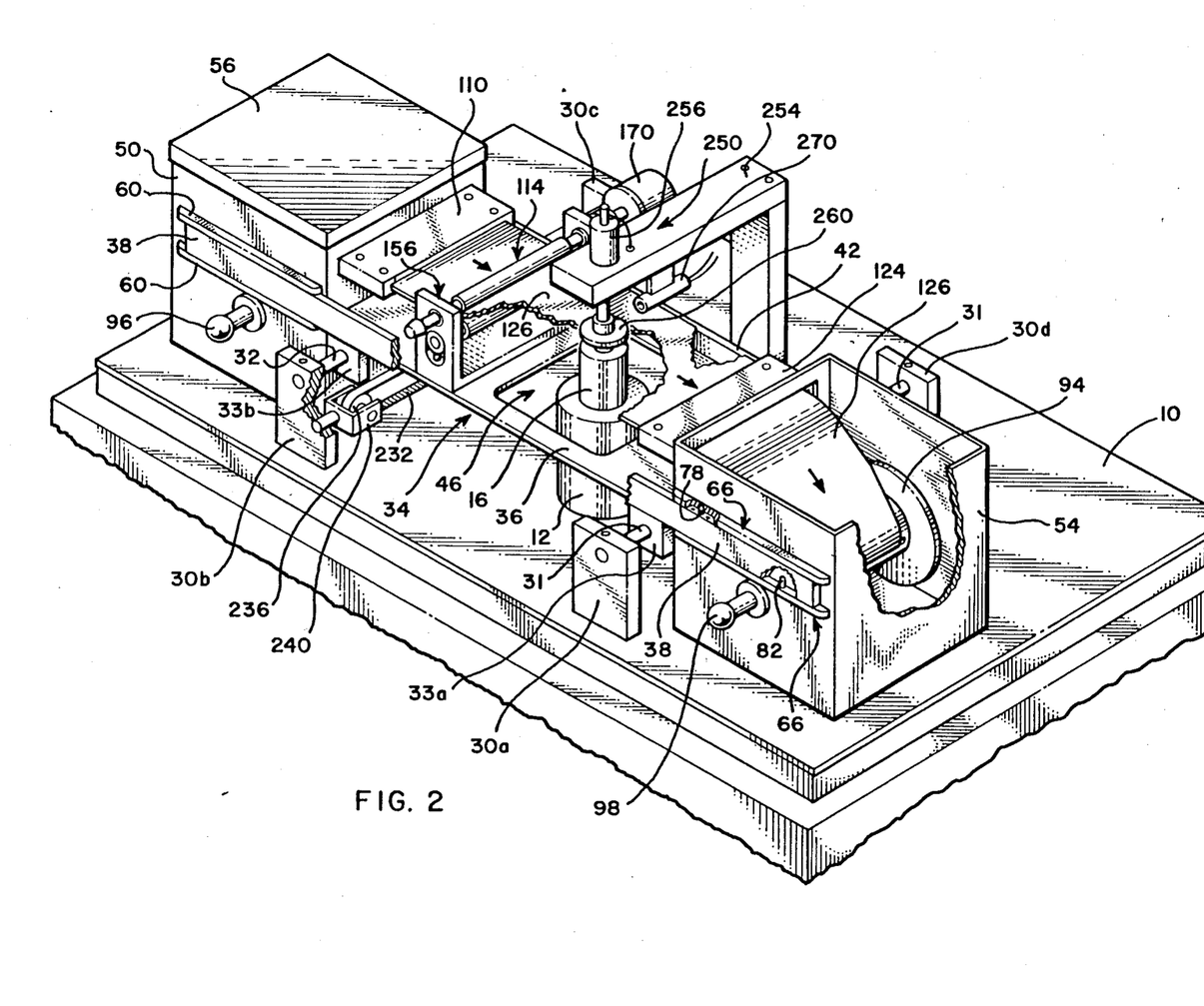
FIG. 2 is a perspective view of the film transport assembly of the system of FIG. 1.

Mounted on the cabinet 4 as a support structure is a frame 30 consisting of brackets 30a, 30b, 30c and 30d upstanding from the base plate 10 (see FIG. 2). A pair of rods 31 and 32 are mounted to extend between brackets 30a and 30d, and 30b and 30c respectively. Fixed to slide on the rods 31 and 32 are four transport mounts 33a, 33b, 33c and 33d which carry a microfilm transport assembly 34. The assembly 34 includes a carriage plate 36 which is mounted on the four mounts 33a, 33b, 33c and 33d, and a pair of generally parallel rails 38 and 42 mounted on the plate 36 to extend above and on each side of a film exposure section 46 over which microfilm will pass for exposure to images produced by the cathode ray tube 8 and focused by the optical focusing lens 16.

Figure 1:
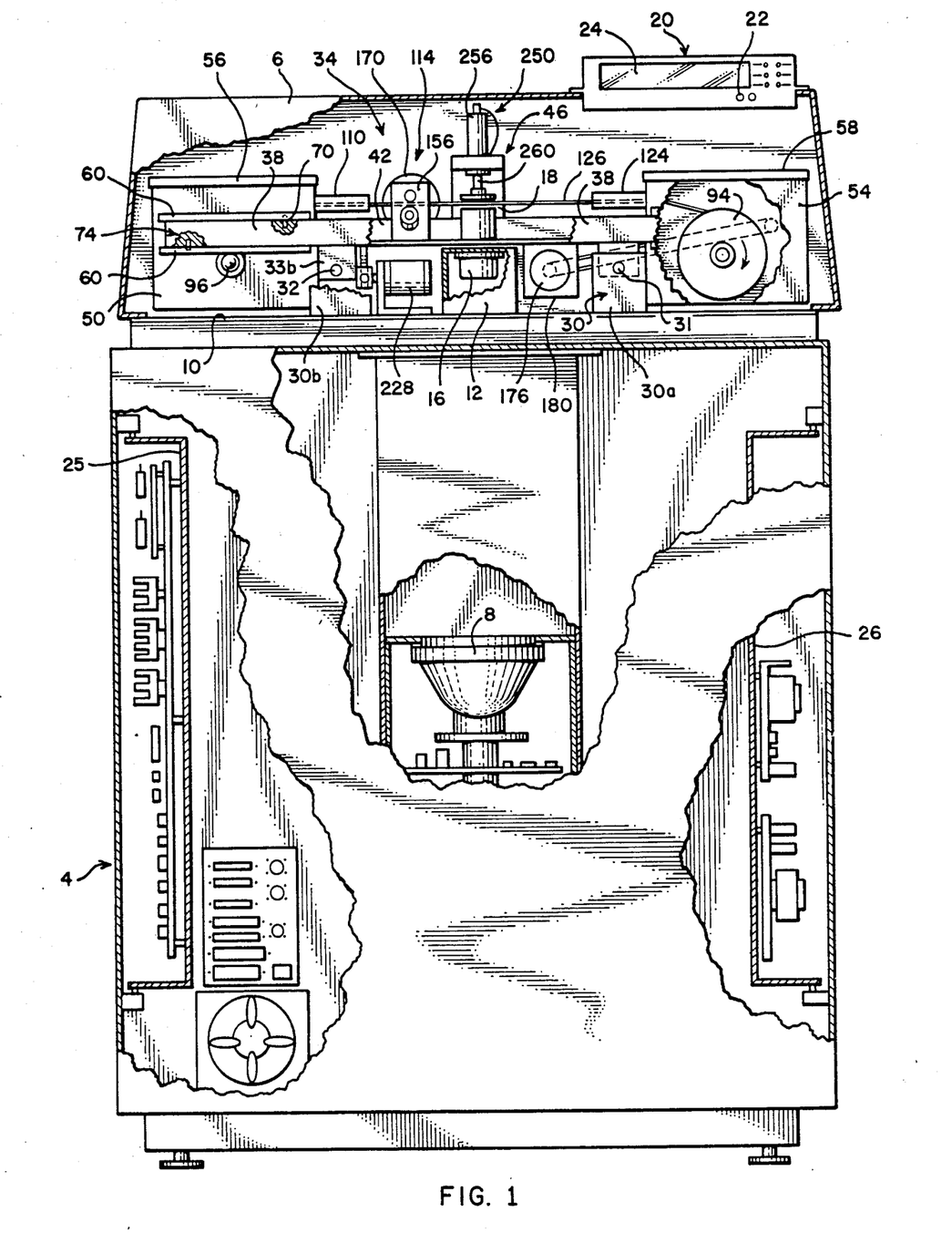
FIG. 1 is a front elevational, partially cut-away view of a microfilm recorder system made in accordance with the principles of the present invention.

The rails 38 and 42 are provided for holding at opposite ends thereof a film supply canister 50 and a film take-up or receiving canister 54. The supply canister 50 is for holding a reel of microfilm which is to be transported or delivered to the exposure section 46 and then wound on a reel contained in the take-up canister 54. The canisters 50 and 54 are formed with four side walls and a bottom wall, with an opening at the top which is covered by lids 56 and 58 (FIG. 1).

Figure 5:
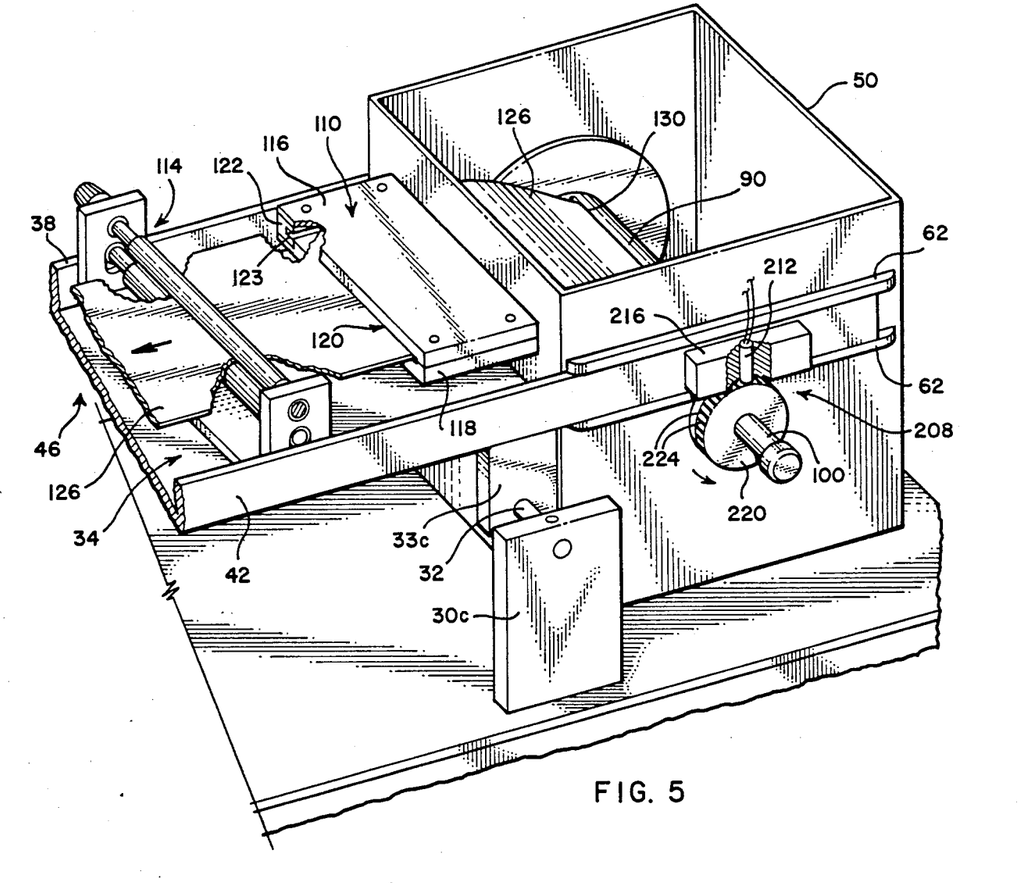
FIG. 5 is a perspective, partially cut-away view of the film supply canister and rollers of the system of FIG. 1.

Located on each side of each of the canisters 50 and 54 are a pair of tracks (60 and 62 for the supply canister 50, and 64 and 66 for the take-up canister 54). As best seen in FIG. 5 for the supply canister 50, the track 62, as with the other tracks, is formed generally to define a channel into which a corresponding rail, such as rail 42, may be inserted. The tracks 60, 62, 64 and 66 and rails 38 and 42 are arranged so that when the canisters 50 and 54 are inserted between the rails, the canisters are aligned on opposite sides of the exposure section 46. The rails 38 and 42 thus serve to both support the canisters 50 and 54 as well as guide and align the canisters.

Detent spring elements hold the canisters in place between the rails 38 and 42. The detent spring elements, such as elements 70, 74 (FIG. 1) and 78 and 82 (FIG. 2), each consist of openings or indentations in the canister tracks and spring loaded plungers or ball detents disposed in the rail 38 (two at the top edge of the rail and two at the bottom edge). When the canisters 50 and 54 are moved along the rails 38 and 42 to the appropriate locations, the plungers move into the openings or indentations formed in the tracks. With the plungers moving into the respective openings or indentations, the two canisters 50 and 54 are locked in place on the rails 38 and 42 in proper alignment. Of course, the canisters may be removed from the rails by simply pulling back on the canisters and sliding the canisters off the free ends of the rails.

Figure 3:
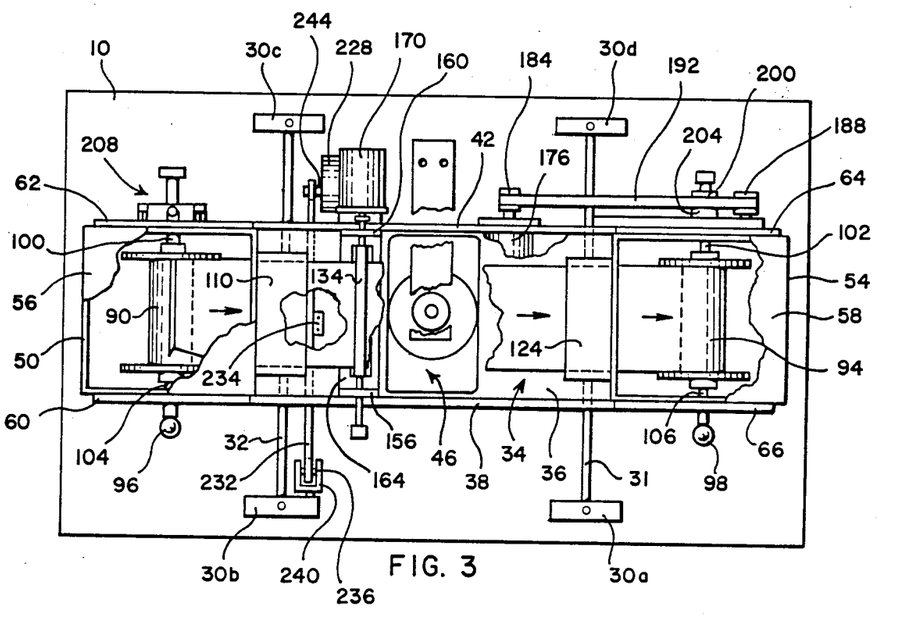
FIG. 3 is a top, partially cut-away, plan view of the film transport assembly of the system of FIG. 1.

The canisters 50 and 54 are each adapted to hold reels on which may be wound rolls of microfilm. Referring to FIG. 3, a reel 90 is shown mounted in a canister 50 and a reel 94 is shown mounted in canister 54. The reels 90 and 94 are conventional microfilm reels having central bores to enable mounting the reels in the canisters in a conventional fashion. For example, reel 94 would be mounted in canister 54 by removing the canister lid, pulling back on a spring-loaded plunger 98 mounted on the side wall of the canister 54, placing the reel 94 in the canister and inserting one end of the central bore of the reel over a rotatable axle 102 which extends through the other side wall of the canister 54, aligning the other end of the reel 94 with the plunger 98 and then releasing the plunger so that the mounting end 106 extends into the central bore of the reel. The reel 90 would be mounted in a similar fashion in canister 50 and since canister 50 is the supply canister, the reel 90 with a roll of microfilm would be mounted in the canister in a dark room to prevent exposure of the film.

After a reel with film is mounted in the supply canister 50, a leading end of the film is fed through a slot in the front canister wall and through a film guide 110, mounted on the front wall of the supply canister 50, to a roller assembly 114. Referring to FIG. 5, the film guide 110 is shown as comprising an upper plate 116 and a lower plate 118, with the latter positioned below the former and formed to define a latitudinal and longitudinal slot 120 therebetween. Disposed at one side of the slot 120 between the plates 116 and 118 is a stainless steel edge guide 122. The edge guide includes a slot 123 for holding and guiding one edge of microfilm moving through the film guide 110. The guide 110 is provided to smooth, flatten and align the film as it leaves the supply canister 50 and approaches the roller oassembly 114. A similar film guide 124 is attached to the front wall of the film take-up canister 54 as best seen in FIG. 2. The film guide 124, however, includes stainless steel edge guides on both sides of the film guide slot, to hold and guide both edges of the microfilm. The film, shown at 126 in FIG. 1, after it leaves the roller assembly 114 is threaded through the film guide 124 into the take-up canister 54 where it is then threaded into the slot of the reel mounted in the canister (such a slot is shown at 130 in the reel 90 of FIG. 5).

Figure 6:
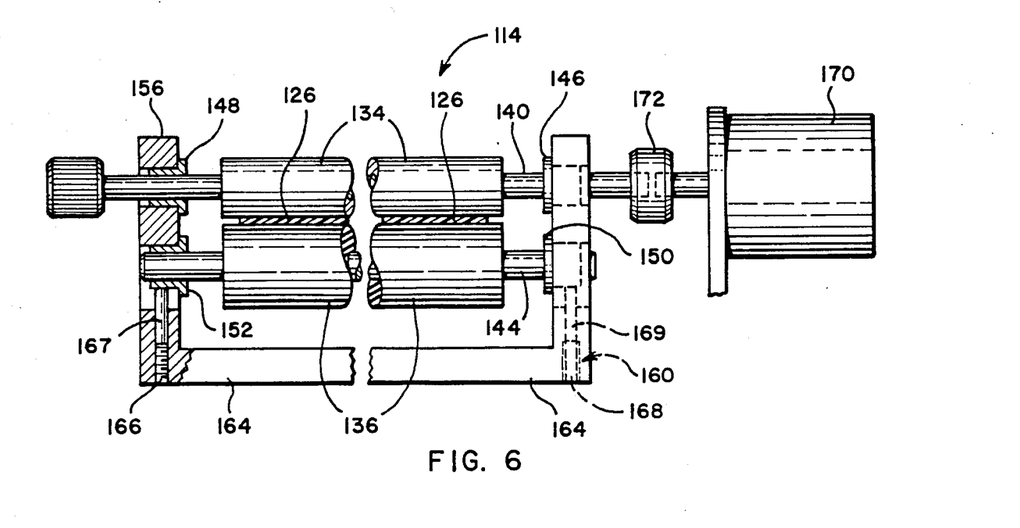
FIG. 6 is a front, elevational, partially cross-sectional view of the rollers of the system of FIG. 1.

The roller assembly 114 is shown in greater detail in FIG. 6. The assembly includes a pair of rollers 134 and 136, one positioned above the other. The upper roller, which is made of steel or other metallic alloy, is smaller in diameter and circumference than the lower roller which is made of rubber or similar resilient material. Provision of a larger lower roller provides for better gripping and thus improved film tracking since there is a greater contact area of the film by the rollers.

The rollers 134 and 136 are respectively mounted on axles 140 and 144. The axles are mounted to rotate about their long axes in bearings 146, 148, 150 and 152 which, in turn, are held by brackets 156 and 160. The brackets 156 and 160 are mounted on a brace 164 which extends between rails 38 and 42 as best seen in FIG. 5. The rollers are thus positioned near the film guide 110 of the supply canister 50 to grip and move the film from the supply canister towards the take-up canister 54. The spacing between the rollers 134 and 136 may be adjusted by adjusting screws 166 and 168 which are positioned below dowels 167 and 169 which support bearings 152 and 150 respectively in the brackets 156 and 160. The screws 166 and 168 are screwed into bores formed in the brackets 156 and 160 to contact the dowels 167 and 169 which in turn contact the bearings 152 and 150 and either raise or lower the bearings which rest on the dowels.

The roller assembly 114 is powered by a stepper motor 170 which is coupled by a mechanical coupling 172 (FIG. 6) to the upper roller 134. The stepper motor 170 causes the upper roller 134 to rotate and move film positioned between the two rollers from the supply canister 50 over the film exposure section 46 to the take-up canister 54. The stepper motor 170 operates under control of a microprocessor housed in the cabinet 4, as will be described later. The microprocessor may be programmed to cause advancement of the film by various size increments to position unexposed film over the film exposure section 46.

Figure 4:
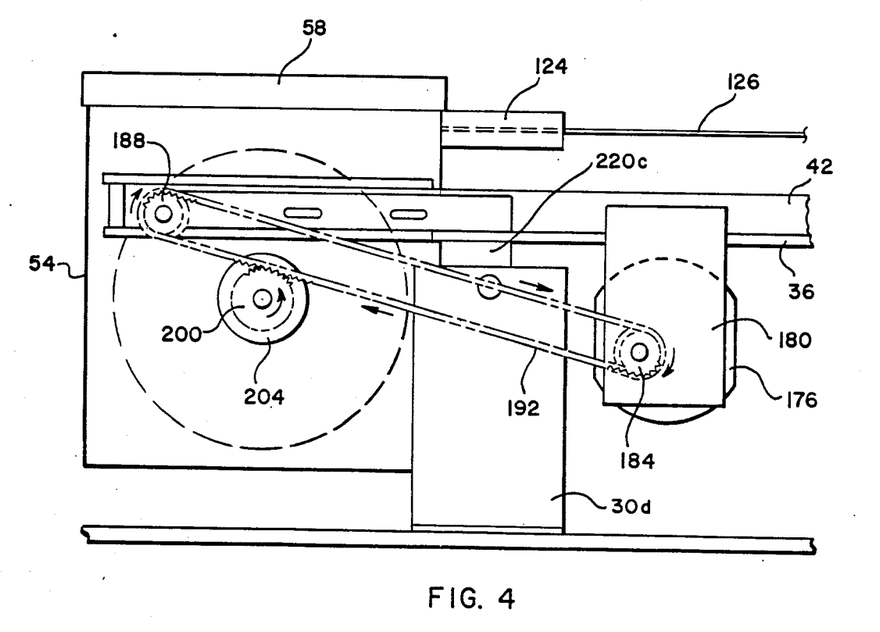
FIG. 4 is a side, elevational, partially cut-away view of the take-up canister and drive mechanism of the system of FIG. 1.

As indicated earlier, the film take-up canister 54 receives microfilm after it has passed over the film exposure section 46 (FIG. 3). The take-up canister 54 includes a reel 94 onto which the leading end of the film is threaded. The reel 94 is caused to rotate to take up any slack in the film and to wind the film on the reel after it has been exposed. The reel is caused to rotate by a driving mechanism which automatically engages the reel when the take-up canister 94 is inserted in position between rails 38 and 42 to the location where the detent elements lock the canister in place. This is best seen in FIG. 4 which shows a gear motor 176 mounted on a bracket 180 which extends downwardly from rail 42. A gear pulley 184 is mounted on the drive shaft of the motor 176. A second gear pulley 188 is mounted to rotate on the rail 42 at a location spaced upwardly and rearwardly from gear pulley 184. A double-sided drive belt 192 (has teeth on both sides) extends about each of the gear pulleys 184 and 188 in a longitudinal fashion as shown in FIG. 4. The belt 192 includes gaps into which the teeth of gear pulleys 184 and 188 will fit to drive and move the belt. The belt is caused to move in the direction indicated by the arrows.

As the take-up canister 54 is inserted between the rails 38 and 42 to a position where the detent elements lock the canister in place, a gear pulley 200 mounted on a slipping clutch assembly 204 which, in turn, is mounted on the canister 54 and coupled to the axle 102 (FIG. 3) automatically engages the drive belt 192. Then, when the drive belt 192 is caused to move by the gear motor 176, the gear pulley 200 is caused to rotate in the direction indicated by the arrows and this, in turn, causes the clutch to turn and cause the axle 102 (FIG. 3) to turn and rotate the reel 94. The slipping clutch assembly 204 will apply a certain maximum torque to the reel 94 to cause it to turn and take up any slack in the microfilm 126, but without putting excessive tension on the film. Such a slipping clutch assembly is conventional.

As the microfilm 126 is moved from the supply canister 50 to the take-up canister 54, the microprocessor monitors the film in the supply canister to determine when the film has been withdrawn from the supply canister. When this condition is detected, the microprocessor stops the stepper motor 170 and the gear motor 176 (FIG. 3) so that a portion of the trailing end of the film is left protruding from the take-up canister 54 for easy grasping and subsequent removal.

FIG. 5 shows a sensing mechanism 208 which includes an optical sensor 212 mounted in a housing 216 which, in turn, is carried by rail 42. The housing 216 and optical sensor 212 are positioned above a slipping clutch wheel mechanism 220 which is mounted on axle 100 and which turns with the axle 100 so long as film is being pulled and unwound from the reel 90. Alternating dark and light stripes 224 are located on the perimeter of the wheel 220 so that movement (or lack of movement) of the wheel can be detected by the sensor 212. The sensor 212 simply supplies a signal to the microprocessor each time movement of the stripes occurs. When the film 126 is pulled completely from the reel 90, the slipping clutch wheel mechanism 220 causes the axle 100 and thus the wheel itself to stop rotating. The slipping clutch 25 wheel mechanism 220 is a conventional device which places a drag or resistance on a rotating element to stop the element if less than a certain force is applied to rotate the element. When the microprocessor receives no signals from the sensor 212 over some predetermined period of time, it stops operation of the stepper motor and gear motor to stop movement of the film. It should be understood that a variety of sensor elements could be employed to detect movement of the clutch wheel 220 including magnetic sensors and mechanical sensors.

Movement of the film longitudinally with respect to the focusing lens 16 is accomplished by operation of the roller assembly 114 as previously discussed. Movement laterally is accomplished by moving the entire film transport assembly 34 on the rods 31 and 32. A second stepper motor 228 mounted on the base plate 10 is coupled to a belt 232 which, in turn, is coupled to belt bracket 234 (FIG. 3). The belt bracket 234 is mounted to the underside of carriage plate 36. The belt 232 is looped about pulley 236 which is rotatably mounted in clevis element 240 attached to bracket 30b, and about pulley 244 mounted on the drive shaft of the stepper motor 228. The microprocessor controls the stepper motor 228 to move the belt 232 and thus move the film transport assembly laterally with respect to the lens 16.

As each frame of film is exposed, a platen assembly 250, mounted on brace 254, is operated by the microprocessor to hold the film 126 against the upper surface 18 of the optical focusing lens 16 FIGS. 1 and 2). This is done by signaling a solenoid 256 to move a plunger 260 downwardly to press the film 126 against the optical focusing lens 16, and then signaling the solenoid to release the plunger after the film is properly exposed.

An infrared sensor 270 is mounted under the brace 254 to direct a beam of infrared light toward the enlarged portion of the plunger 260 each time the solenoid 256 is signaled. If the solenoid 256 operates properly to move the plunger 260 downwardly, the infrared beam misses the enlarged portion of the plunger to indicate proper operation. If the solenoid 256 does not operate properly and the plunger 260 is not moved downwardly, the infrared beam strikes the enlarged portion of the plunger and is reflected back to the sensor 270 to indicate improper operation.

Figure 7:
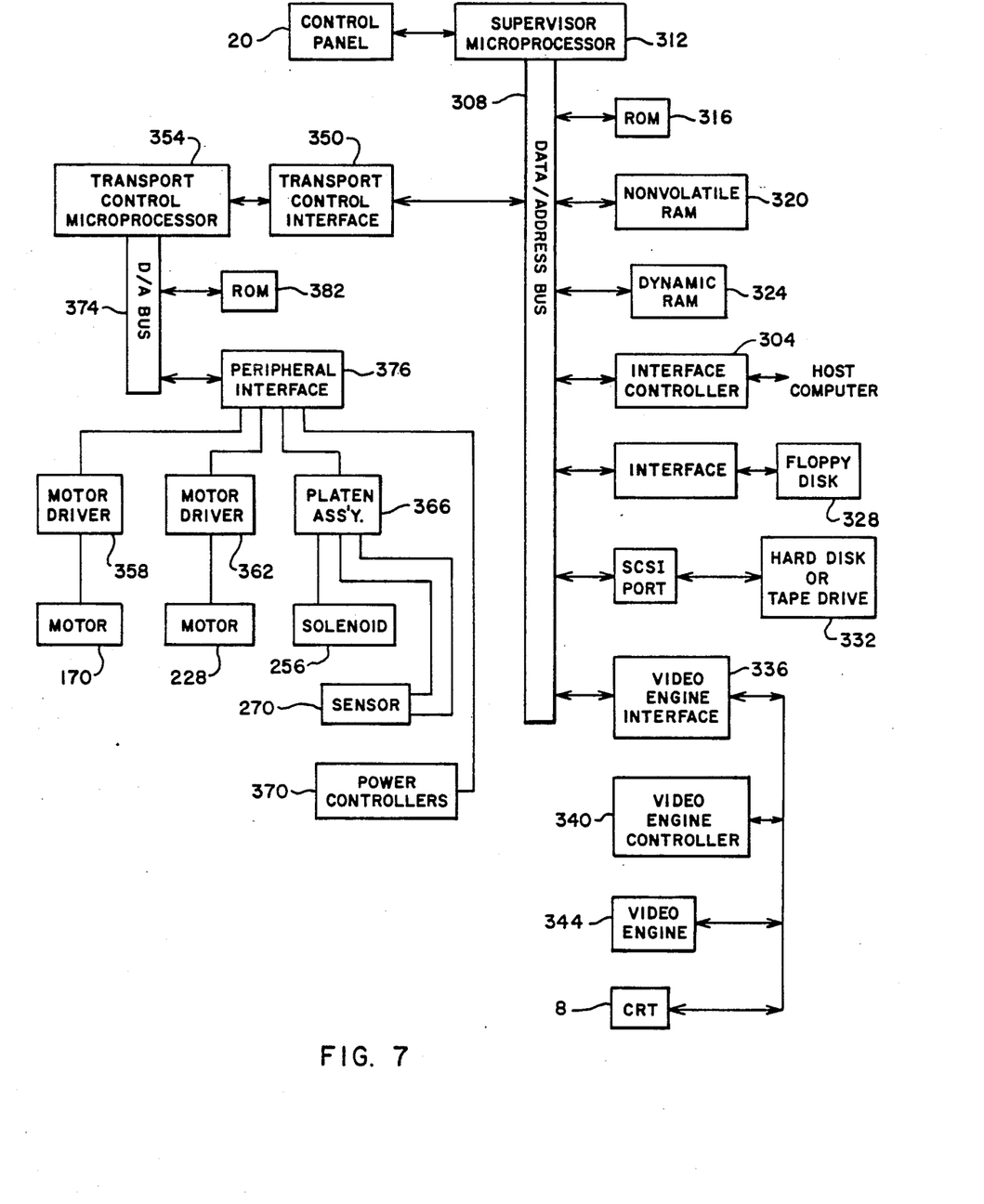
FIG. 7 is a block diagram showing of the principal components of an electronic control system suitable for controlling the operation of the microfilm recorder of the present invention.

FIG. 7 is a block diagram of an illustrative embodiment of an electronic control system which may be utilized to control operation of the parts of the microfilm recorder system described in FIGS. 1-6. Typically, a host computer would supply data and control signals via an interface controller 304 and data/address bus 308 to a supervisor microprocessor 312, identifying information to be produced on the cathode ray tube 8 for recording on microfilm. The supervisor microprocessor 312 also receives from the control panel 20 data and control signals generated manually by the system operator, and supplies information to the control panel for display on the display screen 24 (FIG. 1). The supervisor microprocessor could be any of a number of different microprocessors including the G4180 made by Hitachi.

In response to received data and control signals, the microprocessor 312 produces data and control signals for controlling the operation of the microfilm recorder system pursuant to programs and information stored in read only memory 316, nonvolatile random access memory 320 and dynamic random access memory 324. Additional information for use by the microprocessor 312 may be stored on floppy disk 328 or hard disk or tape 332.

The supervisor microprocessor 312 controls production of displays on the cathode ray tube by supplying data and control signals via the data/address bus 308 and a video engine interface 336 to a video engine controller 340. The video engine controller 340 receives the data and (1) translates the data into an appropriate graphics pattern if graphics are to be displayed, (2) calculates primitives and vectors if in the vector mode, or (3) supplies the data directly to a video engine 344 if in the bit map mode. The video engine 344 receives information from the video engine controller 340 and performs a number of tasks, including production of video timing signals, performance of the video screen refresh function, and production of low level, medium level and high level drawing commands. In this manner, the video engine 344 controls production of displays on the cathode ray tube 8 and these displays are exposed to the microfilm. All this is well known in the art.

The supervisor microprocessor 312 also supplies information and commands via the data/address bus 308 and a transport control interface 350 to a transport control microprocessor 354 for the purpose of controlling the stepper motors 170 and 228, the platen assembly 250, including the infrared sensor 270, and other power functions. The transport control microprocessor 354 responds by signaling motor drivers 358 and 362, a platen assembly driver 366 and power controllers 370, all via a data/address bus 374 and peripheral interface 378 and pursuant to programs stored in read only memory 382. The motor driver 358 controls operation of the stepper motor 170 which advances or retracts the film 126 (to thereby fix the Y coordinate of the image being recorded on the film). The motor driver 362 controls operation of the stepper motor 228 which moves the film transport assembly 34 from side to side (to thereby fix the X coordinate of the image being recorded). The platen assembly driver 366 operates the platen solenoid 256 and the infrared sensor 270 (to produce a beam of light) and receives back from the sensor a signal indicating whether or not a beam reflection was detected. The power controllers 370 generally controls other functions of the microfilm recorder such as film-cut marking, lid locking, and detecting the "film-out" condition. When the "film-out" condition is detected, as earlier described, the stepper motor 170 is ultimately signaled by the transport control microprocessor 354 to stop.

When recording is completed for any currently available data, the supervisor microprocessor 312 supplies information to the transport control microprocessor 354 to signal the motor driver 362 and motor 228 to move the film transport assembly 34 to one side so that the microfilm 126 is moved out of the exposure area to avoid the effects of the corona from the cathode ray tube 8. If this were not done, then the corona of the CRT 8 could inadvertently expose the film making it unuseable for recording information.

The recorder system of the present invention is operated by first installing a roll of microfilm in the film supply canister 50, threading the film through the film guide 110, the roller assembly 114, over the optical focusing lens 16 and below a film platen assembly 250, through the film guide 124 and onto a reel in the take-up canister 54. The operator of the system provides input to initialize and initiate operation of the system either via the control panel 20 (FIG. 1) or the interface controller 304 (FIG. 7). After initialization, the system is ready to photograph on microfilm alphanumeric or graphic data either stored in system memory or supplied from the host computer. The information to be photographed is appropriately formatted by the supervisor microprocessor 312, as earlier described, and then transferred to the video engine controller 340 and video engine 344 where it is prepared for display on the cathode ray tube 8. While this is taking place, the transport control microprocessor 354 operates the stepper motors 170 and 228 to respectively move the film from the supply canister 50 to the take-up canister 54, and move the transport assembly 34 laterally until the film 126 is positioned at the initial frame location above the focusing lens 16. The transport control microprocessor 354 then activates the platen assembly 250 to hold the film against the upper surface of the focusing lens 16. The information to be recorded on the initial frame of the film is supplied to the cathode ray tube 8 which is then unblanked to produce an image of the information. This image is reduced by the focusing lens 16 and a latent image is thereby placed on the film 126. After a predetermined time interval, the cathode ray tube 8 is blanked, the platen assembly 250 is released, and the film and/or film transport assembly 34 are advanced to the next frame position.

The above-described recording process continues for a predetermined number of rows and columns on the film to make up a complete fiche, after which the supervisor microprocessor 312 temporarily halts any incoming data from the host computer, hard disk, tape, etc. An "eye-readable" title, previously entered via the control panel 20 or from the host computer, is then placed on the film by the cathode ray tube 8 under control of the supervisor microprocessor 312. Other information, such as data previously extracted during the filming process (e.g. a header from the starting and finishing document) can then be inserted into the title at the discretion of the operator.

Additonal fiches or portions of fiches are recorded until either all data has been received and photographed, the operator intervenes, or roll of film in the supply canister 50 is depleted. The transport control microprocessor 354 predetermines the status of the film in the supply canister 50 by first advancing the film by three fiche lengths at the beginning of each new fiche, while at the same time monitoring the "film-out" condition by way of the sensing mechanism 208. If it is determined that there is still film in the supply canister 50 (because the wheel 220 is determined to still be moving) at the end of the third fiche, the film is reversed back into the supply canister 50 for two fiche lengths and filming commences. If it is determined that the film supply is depleted (the wheel 220 is determined not to be moving), the optical sensor 212 signals the transport microprocessor 354 that the film is depleted and no more filming should be undertaken until a new roll of film is installed.

When a "film-out" condition is detected, the film is advanced into the take-up canister 54 to protect the latent images from light when the cabinet cover 6 is raised. The transport control microprocessor 354 advances the film into the take-up canister 54, but leaves a short trailer portion of the film exposed for easy grasping and removal of the film when it is to be developed.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A microfilm recorder system comprising
   a frame,
   a film supply means mountable on the frame for holding a roll of microfilm,
   a film take-up means insertable on and removable from the frame for receiving the film, said film take-up means including
     reel means on which the film is wound when the reel is rotated, and
     driven wheel means which, when rotated, causes the reel means to rotate,
   means mounted on the frame for automatically moving the film for exposure between the film supply means and the film take-up means, and
   driving means mounted on the frame to automatically engage the perimeter of the driven wheel means when the film take-up means is inserted on the frame, for causing the driven wheel means to rotate.

2. A system as in claim 1 wherein said driven wheel means comprises a first gear wheel coupled to the reel means, said gear wheel having a plurality of teeth on the perimeter thereof, and wherein said driving means includes elements for engaging the gear wheel teeth.

3. A system as in claim 2 wherein said driving means comprises
   second and third spaced-apart gear wheels rotatably mounted on the frame,
   a drive belt looped about the second and third gear wheels along a certain generally longitudinal alignment to move as the wheels are rotated, said belt including gaps for receiving the teeth of the first gear wheel and being positioned for engagement by the first gear wheel as the film take-up means is inserted on the frame, and
   power means for rotating the second gear wheel.

4. A system as in claim 3 further including means for guiding the film take-up means along a direction forming an oblique angle with said longitudinal alignment of the drive belt so that the first gear wheel engages the belt at a location intermediate the second and third gear wheels.

5. A system as in claim 1 wherein said film supply means comprises
   a housing having a slot through which the film may be fed,
   reel means mountable in the housing to rotate as film held on the reel means is pulled through the slot, said reel means including receptacles on opposite sides thereof for engaging mounting elements,
   a fixed mounting element located on one side of the housing for engaging a receptacle of the reel means, and
   a moveable mounting element located on the other side of the housing and moveable into engagement with the other receptacle of the reel means to hold the reel means in place in the housing.

6. A system as in claim 5 wherein said moveable mounting element comprises a spring-loaded plunger.

7. A system as in claim 1 wherein said frame includes an exposure section located between the film supply means and the film take-up means through which the film travels,
   a first pair of generally parallel, spaced-apart rails extending in a first direction from the exposure section,
   a second pair of generally parallel, spaced-apart rails extending in a second direction, opposite the first direction, from the exposure section,
   wherein said film supply means comprises a supply canister for holding and dispensing a roll of film, said canister including a pair of generally parallel tracks located on opposite sides of the canister for receiving the first pair of rails when the canister is inserted therebetween, and
   wherein said film take-up means comprises a take-up canister for receiving and holding a roll of film, said take-up canister including a second pair of generally parallel tracks located on opposite sides of the canister for receiving the second pair of rails when the canister is inserted therebetween.

8. A system as in claim 7 further including
   first detent means for securing the supply canister in place between the first pair of rails when the canister is moved to a certain location along the first pair of rails, and
   second detent means for securing the take-up canister in place between the second pair of rails when the canister is moved to a predetermined location along the second pair of rails.

9. A system as in claim 8 wherein said driving means and driven means are positioned so that when the take-up canister is moved to said certain location along the second pair of rails, the driven means engages the driving means.

10. A system as in claim 1 further including a guide means which comprises
    first means defining a generally planar slot for guiding film passing therethrough into a generally thin, flat cross-section, said first means being positioned adjacent to the film supply means to enable threading the film through the slot as the film leaves the film supply means, and
    second means also defining a generally planar slot for guiding film passing therethrough into a generally thin, flat cross-section, said second means being positioned adjacent to the film take-up means to enable threading the film through the slot of the second means just before the film enters the film take-up means, and
    the slots of said first and second means being positioned generally in alignment.

11. A system as in claim 1 wherein said film moving means includes a pair of rollers, one positioned above and in contact with the film and the other positioned below and in contact with the film, said rollers being positioned between the film supply means and the film take-up means for controlling movement of the film, wherein one of the rollers has a larger diameter than the other.

12. A system as in claim 11 wherein the bottom roller has a larger diameter than the top roller, and wherein the top roller is made of a metallic alloy and the bottom roller is made of a resilient material.

13. A system as in claim 11 wherein said film moving means further includes a stepper motor coupled to at least one of the rollers for causing the rollers to turn and move the film positioned therebetween.

14. A system as in claim 13 further including microprocessor means for controlling the operation of the stepper motor pursuant to programs stored in the microprocessor means.

15. A system as in claim 14 wherein said microprocessor means is programmed to control the stepper motor to cause the film to move in incremental steps a distance corresponding to the size of a frame of the film.

16. A system as in claim 11 further including manually operable roller adjustment means for varying the distance of separation between the rollers.

17. A system as in claim 1 further including sensing means for determining when the film has been completely withdrawn from the film supply means, and means for signaling the film moving means to terminate movement of the film when the sensing means determines that the film has been withdrawn from the film supply means.

18. A system as in claim 17 wherein said film supply means includes reel means on which the film is wound, and which is mounted to rotate as film is withdrawn therefrom, and to stop rotation when the film is completely withdrawn from the reel means, and wherein said sensing means includes means for determining when the reel means has stopped rotation.

19. A system as in claim 18 wherein said reel means includes a generally circular disk mounted to rotate as the reel means is rotated, said disk including indicia thereon arranged generally in a circle at or near the perimeter of the disk, wherein said film moving means includes roller means for gripping and moving the film when operated, and a stepper motor coupled to the roller means for causing the roller means to operate and move the film, wherein said system further includes a microprocessor means for controlling operation of the stepper motor pursuant to programs stored in the microprocessor means and for signaling the stepper motor to stop operation of the roller means in response to a film-out signal, and wherein said sensing means includes an optical sensor for detecting movement of the indicia on the disk and for supplying the microprocessor a film-out signal when movement of the indicia stops.

20. A microfilm recorder system comprising
a frame,
a film supply means mountable on the frame for holding a roll of microfilm,
a film take-up means insertable on and removable from the frame for receiving the film, said film take-up means including
reel means on which the film is wound when the reel is rotated, and
driven means which, when driven, causes the reel means to rotate,
means mounted on the frame for automatically moving the film for exposure between the film supply means and the film take-up means,
driving means mounted on the frame to engage the driven means for driving the driven means,
first means defining a generally planar slot for guiding film passing therethrough into a generally thin, flat cross-section, said first means being positioned adjacent to the film supply means to enable threading the film through the slot as the film leaves the film supply means, and
second means also defining a generally planar slot for guiding film passing therethrough into a generally thin, flat cross-section, said second means being positioned adjacent to the film take-up means to enable threading the film through the slot of the second means just before the film enters the film take-up means,
the slots of said first and second means being positioned generaly in alignment,
wherein said first and second slot defining means each comprises
a bottom plate positioned so that film moving from the film supply means to the film take-up means passes over the upper surface of the plate,
a top plate positioned above the bottom plate to define a latitudinal and longitudinal slot therebetween so that film moving from the film supply means to the film take-up means passes under the lower surface of the top plate,
wherein said first slot defining means further comprises a stainless steel edge guide positioned at one side of the first slot to hold and guide one edge of a film moving through the first slot defining means, and
wherein said second slot defining means further comprises a pair of stainless steel edge guides positioned at each side of the second slot to hold and guide both edges of a film moving through the second slot defining means.

21. A system as in claim 20 wherein said first slot defining means is attached to the film supply means, and wherein said second slot defining means is attached to the film take-up means.

22. A microfilm recorder system comprising
a frame,
a film supply means mountable on the frame for holding a roll of microfilm,
a film take-up means insertable on and removable from the frame for receiving the film, said film take-up means including
reel means on which the film is wound when the reel is rotated, and
driven means which, when driven, causes the reel means to rotate,
means mounted on the frame for automatically moving the film for exposure between the film supply means and the film take-up means,
driving means mounted on the frame to engage the driven means for driving the driven means,
wherein said film moving means includes
a pair of spaced-apart side supports,
four bearings, two disposed in each side support one above the other,
two axles, the ends of which are disposed in respective bearings, and
two roller bodies, each mounted on a different axle, and
roller adjustment means comprising a pair of adjustment screws, each disposed in a different side support below and in contact with the lowermost bearing in that side support so that when turned in one direction, the respective bearing is raised, and when turned in the other direction, the respective bearing is lowered, to thereby raise or lower the lowermost axle and roller body.

23. A microfilm recorder system comprising
a base,
a film transport assembly mounted on the base to move laterally from side to side, said assembly including
a film supply means for holding a reel of microfilm and for dispensing the film, a film receiving means for holding a reel on which microfilm may be wound as it is received from the film supply means, a film exposure section disposed between the film supply means and film receiving means, through which film passes as it moves from the film supply means to the film receiving means, and first power means responsive to control signals for moving the film from the film supply means to the film receiving means for exposure of longitudinal portions of the film in the film exposure section, second power means responsive to control signals for moving the film transport assembly laterally, for exposure of latitudinal portions of the film in the film exposure section, and control means for supplying control signals to the first and second power means and for signalling the second power means to move the film transport assembly to one side of the base out of the film exposure section when exposure of the film is completed.

24. A microfilm recorder system for recording optical information on reel-wound film, said system comprising film supply means for holding a reel of microfilm, the reel being mountable to rotate as film is pulled by a leading end thereof, film receiving means for holding a reel on which microfilm may be wound, the reel being mountable to rotate and wind thereon film received from the film supply means, first guide means for receiving and positioning the film supply means in a predetermined location when the film supply means is inserted on the guide means, second guide means for receiving and positioning the film receiving means in a certain position when the film receiving means is inserted on the second guide means, said first guide means and second guide means being spaced-apart on opposite sides of a film exposure section over which film may pass for exposure, means for transporting the film from the film supply means to the film receiving means over the film exposure section, wherein said film supply means comprises a film supply housing for holding and dispensing a roll of film, and a pair of generally parallel tracks located on opposite sides of the housing, wherein in said film receiving means comprises a film receiving housing for receiving and holding film dispensed from the film supply housing, and a pair of generally parallel tracks located on opposite sides of the film receiving housing, wherein said first guide means includes a first pair of gnerally parallel rails extending in a first direction from the exposure section, and spaced apart a distance to allow engaging and receiving the traacks of the film supply housing when the film supply housing is inserted between the first pair of rails, and wherein said second guide means includes a second pair of generally parallel rails extending from the opposite side of the exposure section in a second direction, opposite the first direction, said second pair of rails being spaced apart a distance to allow engaging and receiving the tracks of the film receiving housing when the film receiving housing is inserted between the second pair of rails.

25. A system as in claim 24 further including first detent means for securing the film supply housing in place in said predetermined location when the film supply housing is inserted between the first pair of rails, and second detent means for securing the film receiving housing in place in said certain position when the film receiving housing is inserted between the second pair of rails.

26. A microfilm recorder system for recording optical information on reel-wound film, said system including a frame, a film supply means for holding a reel of microfilm, the reel being mountable to rotate and dispense film as film is pulled therefrom, a film receiving means for holding a reel on which microfilm may be wound, the reel being mountable to rotate and wind thereon film received form the film supply means, said film supply means and film receiving means being positioned on the frame on opposite sides of a film exposure section over which film may pass for exposure, means for transporting the film from the film supply means to the film receivng means over the film exposure section, first guide means disposed adjacent to the film supply means and including two plates, one positioned in parallel with and above the other to define a generally planar slot for receiving and flattening film dispensed by the film supply means, second guide means disposed adjacent to the film receiving means and including two plates, one positioned in parallel with and above the other to define a generally planar slot for receiving, flattening and guiding to the film receiving means film supplied by the film supply means which has passed over the film exposure section, and wherein the slots of said first and second guide means are positioned generally in alignment.

27. A system as in claim 26 wherein said film transporting means comprises a pair of rollers, one positioned above and the other, for moving film threaded therebetween from the first guide means to the second guide means, one of said rollers being larger in circumference than the other, and means for powering the rollers to rotate and move film threaded therebetween.

28. A microfilm recorder system comprising a frame, a film supply means disposed on the frame for holding a reel of microfilm, the reel being mountable to rotate as film is pulled from the film supply means, a film take-up means disposed on the frame for receiving film supplied by the film supply means, means for transporting the film from the film supply means to the film take-up means in response to control signals, and control means for sensing when all film has been withdrawn from the film supply means, and for producing control signals to control operation of the film transporting means and to stop operation of the film transporting means when all film has been withdrawn from the film supply means.

29. A system as in claim 28 wherein the reel in the film supply means is mounted to stop rotation when all film has been withdrawn therefrom, and wherein said control means includes means for sensing rotation of the reel in the film supply means, and microprocessor means responsive to the sensing means for producing a control signal to stop operation of the transporting means when the reel in the film supply means has stopped rotating.

30. A system as in claim 29 further including a generally circular disk mounted to rotate as the reel in the film supply means is rotated, said disk including indicia thereon arranged generally in a circle at or near the perimeter of the disk, wherein said film transporting means includes roller means for gripping and moving the film when operated, and the stepper mode are coupled to the roller means for causing the roller means to operate and move the film in response to control signals form the microprocessor means, and wherein said sensing means includes an optical sensor for detecting the movement of the indicia on the disk and for supplying to the microprocessor means signals indicating that the indicia on the disk is moving.

31. A microfilm recorder system comprising a frame, a film supply means disposed on the frame for holding a reel of microfilm and for dispensing the film from the reel, a film take-up means disposed on the frame for receiving film supplied by the film supply means, a focusing lens housing disposed between the film supply means and film take-up means beneath the plane through which the film passes, for holding a focusing lens, said housing including a generally planar top surface, a platen assembly disposed above the focusing lens housing and including a plunger movable downwardly in response to operate signals to contact and force the film against the top surface of the housing, control means for supplying operate signals to the platen assembly, and sensing means for signalling the control means if the plunger is not moved downwardly in response to operate signals.

32. A system as in claim 31 wherein said sensing means comprises an infrared beam transmitter and receiver positioned to direct a beam of infrared light toward the plunger to be reflected therefrom back to the receiver when the plunger is not moved downwardly.

* * * * *